UNITED STATES PATENT OFFICE.

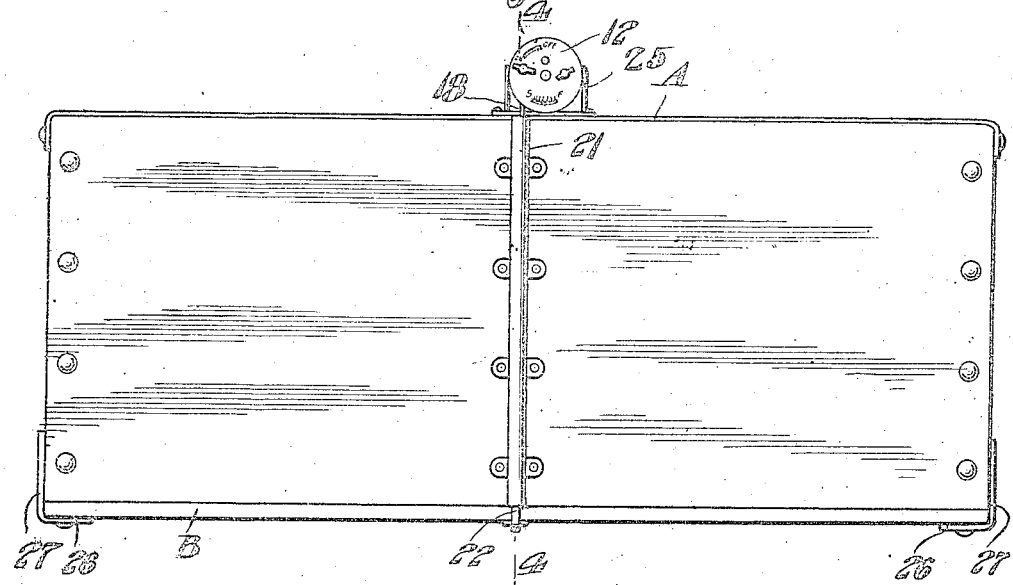
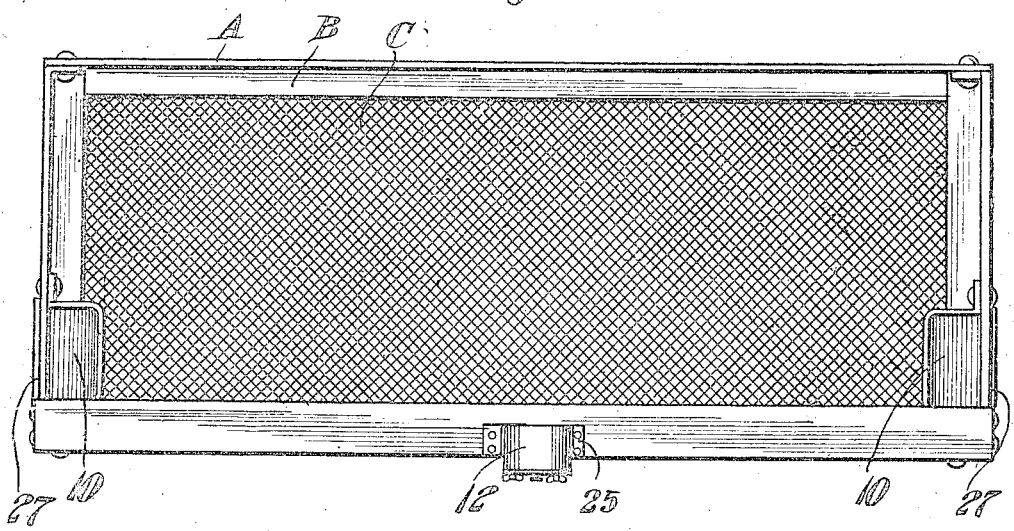

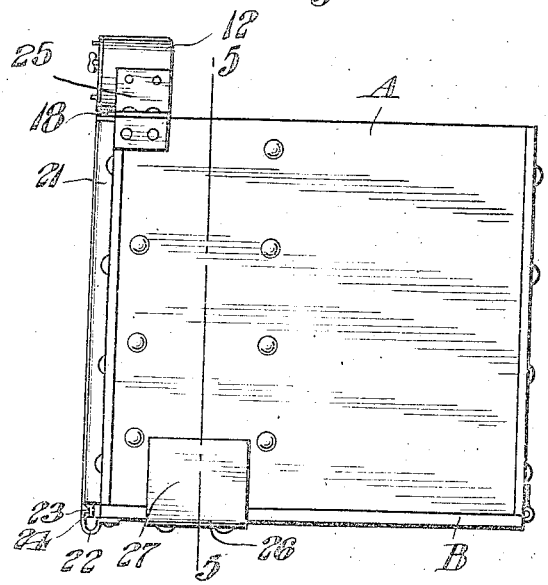
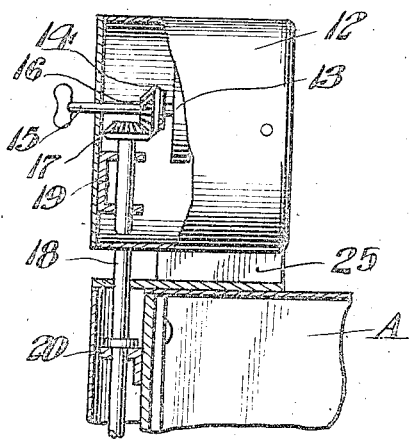
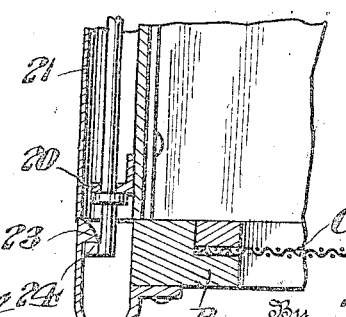

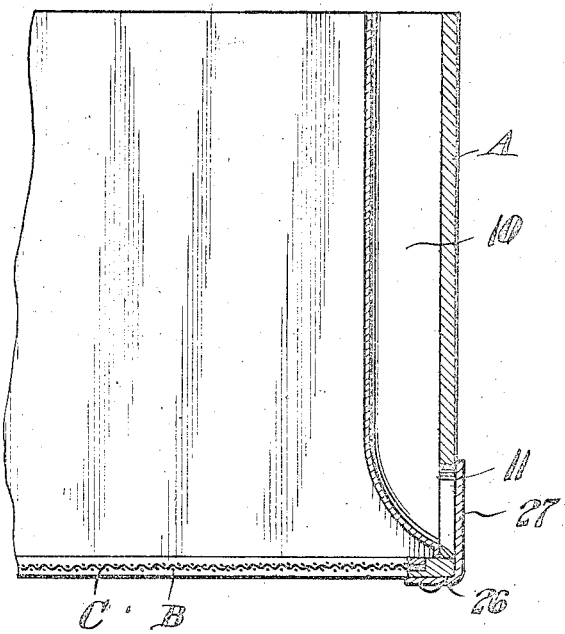
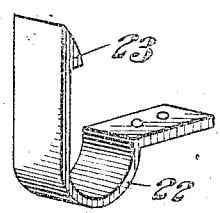
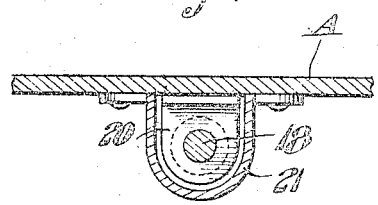

HARUMICHI KAMADA AND TOHORU ISHIZUKA, OF SACRAMENTO, CALIFORNIA.

ANIMAL-FEEDER.

1,214,314.  Specification of Letters Patent.  Patented Jan. 30, 1917.

Application filed May 16, 1916. Serial No. 97,965.

*To all whom it may concern:*

Be it known that we, HARUMICHI KAMADA and TOHORU ISHIZUKA, residents of the United States, residing at Sacramento, in the county of Sacramento and State of California, have invented new and useful Improvements in Animal-Feeders, of which the following is a specification.

The invention relates to feeders, and more particularly to the class of time control animal feeders.

The primary object of the invention is the provision of a feeder of this character wherein stock, such as horses, cattle or the like, can be fed at predetermined intervals, the stock feed being automatically controlled for the delivery of the same into the feeding trough or troughs for the animals at a given period or periods of time, thereby obviating the necessity of manual labor for this purpose.

Another object of the invention is the provision of a feeder of this character wherein a time clock of any approved type will serve to automatically operate the said feeder for the delivery of feed to stock at a given period, thereby enabling the early morning feeding of the stock without personal manual attention, thereby eliminating the inconvenience and early rising of an attendant as usual for this purpose, the feeder being designed particularly for use in farming districts, although the same is not restricted to such use, as will be obvious.

A further object of the invention is the provision of a feeder of this character which is novel in construction to assure the automatic feeding of stock at any predetermined time.

A still further object of the invention is the provision of a feeder of this character which is simple in construction, thoroughly reliable and efficient in operation, strong, durable and inexpensive in manufacture and installation.

Other objects will be in part obvious and in part hereinafter set forth.

The invention accordingly consists in the features of construction, combination of elements and arrangements of parts which will be exemplified in the construction hereinafter described, and the scope of the application of which will be hereinafter defined in the appended claims.

In the accompanying drawings: Figure 1 is a front elevation of a feeder constructed in accordance with the invention; Fig. 2 is a top plan view thereof; Fig. 3 is an end elevation; Fig. 4 is a vertical transverse sectional view taken on the line 4—4 of Fig. 1; Fig. 5 is a fragmentary sectional view on the line 5—5 of Fig. 3; Fig. 6 is a perspective view of a keeper used upon the feeder; Fig. 7 is a detailed sectional view through the forward portion of the feeder.

Referring to the drawings in detail, A designates a container which is of substantially box-like form and may be of any capacity to hold hay or other food stuff for stock, having a hinged bottom B which serves as a drop door for the container to permit the discharge of the contents thereof, the bottom B being provided with a reticulated center or panel C made from any suitable material, and this container A is adapted to be mounted above the feed trough for the stock within or without an inclosure.

Formed interiorly of the container A at opposite ends thereof are grain chutes 10, each having their lower ends opening through the said ends, as at 11, for the discharge of grain into the feed trough for the stock, and these chutes 10 lead from any suitable point of supply for holding the grain to be delivered to the feed trough for the stock.

Above the container A centrally thereof is arranged a clock casing 12 having interiorly thereof any suitable clock works 13 including the alarm works 14, and these works are spring driven as usual, the clock works being set by hand and likewise the alarm works 14 are set by hand, as usual. On the arbor 15 of the alarm works 14 within the clock casing 12 is fitted a beveled pinion 16 with which meshes a companion beveled pinion 17, the latter being secured to the upper end of a vertical shaft 18 which is protruded within the clock casing 13 and supported in bearings 19 which are fixed interiorly of the said casing 12 as shown. The shaft 18 is arranged forwardly of the front of the container A in bearings 20 which are fixed to the front wall of the said container, and this shaft is incased within a suitable housing 21 mounted upon said front wall of the container.

Fixed to the outer face of the bottom B at the front edge thereof, centrally of the same, is a hook-like keeper 22, the hook bill 23 of which normally engages a segment 24 formed at the lower end of the shaft 18, and in this manner the bottom B is retained in closed position. When the clock mechanism is active and the alarm works 14 is set for a predetermined period of time the arbor 15, at the given time, rotates and similar movement is imparted to the shaft 18 which turns the segment 24, releasing the keeper 22 so that the bottom 15 swings to open position, thereby discharging the contents of the container A into the feed trough of the stock. The bottom B after the discharge of the contents of the container A is swung to closed position and the keeper 22 again engaged with the segment 24.

The casing 12 of the clock is secured to brackets 25 which are fastened to the top of the container A and in this manner the said clock casing 12 is permanently and securely mounted in place upon said container.

Secured to opposite ends of the bottom B are L-shaped plates 26, the vertical portions of which form shutters or gates 27 for closing the open ends 11 of the chutes 10 until the bottom B has dropped to open position, whence the said open ends 11 will be uncovered and the grain will be delivered from the chutes 10 into the trough for the feeding of the stock.

From the foregoing description, taken in connection with the accompanying drawing, the construction and operation of the herein described feeder will be readily apparent and, therefore, a more extended explanation has been omitted.

Having thus described our invetnion, we claim:

1. A feeder comprising a container, a door hinged thereto, a keeper on said door, a rotatable shaft having a segment for locking engagement with the keeper and supported by the container, means for actuating the shaft, chutes located interiorly of the container and opening through the ends thereof and gates on the door for normally closing the ends of the chutes.

2. A feeder comprising a container, a door hinged thereto, a keeper on said door, a shaft journaled upon the container and having a segment for locking engagement with the keeper, means for actuating the shaft, chutes located interiorly of the container and opening through the ends thereof, gates on the door for normally closing the ends of the chutes, and a housing containing the shaft and supported by the container.

In testimony whereof we affix our signatures.

HARUMICHI KAMADA.
TOHORU ISHIZUKA.

Witnessed by:
M. B. HOHORI,
J. MIYA GAWA.